(12) United States Patent
Joseph et al.

(10) Patent No.: US 7,433,854 B2
(45) Date of Patent: Oct. 7, 2008

(54) BACKWARD CHAINING WITH EXTENDED KNOWLEDGE BASE NETWORK

(75) Inventors: Sindhu Joseph, Wayanad (IN); Rui Zhang, Haidian District (CN)

(73) Assignee: Honeywell International Inc., Morristown, NJ (US)

(*) Notice: Subject to any disclaimer, the term of this patent is extended or adjusted under 35 U.S.C. 154(b) by 446 days.

(21) Appl. No.: 11/186,324

(22) Filed: Jul. 21, 2005

(65) Prior Publication Data

US 2007/0094193 A1    Apr. 26, 2007

(51) Int. Cl.
G06F 15/18 (2006.01)
G06F 17/00 (2006.01)
G06N 5/00 (2006.01)
G06N 5/02 (2006.01)

(52) U.S. Cl. .............................. 706/46; 706/45; 706/14
(58) Field of Classification Search .................. 706/46, 706/45, 14; 705/9
See application file for complete search history.

(56) References Cited

U.S. PATENT DOCUMENTS

| | | | | |
|---|---|---|---|---|
| 4,849,905 A | * | 7/1989 | Loeb et al. | 706/48 |
| 4,924,408 A | * | 5/1990 | Highland | 706/60 |
| 5,119,470 A | * | 6/1992 | Highland et al. | 706/48 |
| 5,159,662 A | * | 10/1992 | Grady et al. | 706/48 |
| 5,265,193 A | * | 11/1993 | Grady et al. | 706/48 |
| 2002/0049625 A1 | * | 4/2002 | Kilambi et al. | 705/9 |
| 2004/0158545 A1 | * | 8/2004 | Turgeon | 706/46 |
| 2005/0246301 A1 | * | 11/2005 | Lin et al. | 706/47 |

* cited by examiner

*Primary Examiner*—Joseph P Hirl
(74) *Attorney, Agent, or Firm*—Schwegman, Lundberg & Woessner, P.A.

(57) ABSTRACT

Mixed mode inferencing is provided by creating an extension to a RETE network to handle both forward and backward chaining efficiently. The extended RETE network is traversed from a root node through intermediate nodes to the rules of the network. The intermediate nodes contain objects that have values assigned by rules, and the intermediate nodes are linked to those rules appropriately. When using the network in a backward chaining context, rules linked to the intermediate node of interest are checked to see if they are active and the rule is solvable. If not, the related rules are checked. Because the system takes advantage of the previously formed RETE network, these checks can be done at the rule nodes without the need to retest each condition.

30 Claims, 4 Drawing Sheets

BACKWARD CHAINING WITH EXTENDED KNOWLEDGE BASE NETWORK

BACKGROUND

Expert systems are generally employed by applying an inference engine to a knowledge base. Two popular methods used in expert systems are forward chaining and backward chaining.

Forward chaining refers to the process of testing rules against known facts in a knowledge base. A rule consists of one or more conditions and an action. If the conditions are met, the inference engine may fire the rule. An example of a rule might be, "if A>10, then B=10." The knowledge base consists of facts representing objects with assigned values, e.g. "A=20." The knowledge base may also contain rules. Forward chaining generally compares each fact with each rule to create a list of rules that may be fired. For the examples above, comparing the knowledge base with the rules would reveal that the rule could be fired. If multiple rules could be fired, the expert system usually includes a method for determining which rule has priority, because the order of firing can alter the results found by the expert system. Since there is no other rule to fire for the example rule and fact, it would fire and the knowledge base would be expanded to include "B=10."

Forward chaining is a very effective and widely used strategy. Integration of a wide variety of systems and sources of information allow access to large knowledge bases, increasing the power of forward chaining. However, large knowledge bases and rule sets increase the need for improved computational power and organization. Forward chaining is not effective in solving all problems. Some problems, such as diagnostics, are more suitable to solving by backward chaining.

One well known and efficient version of forward chaining is a RETE network. A RETE network achieves improved performance over the standard forward chaining algorithm because it creates a tree that links conditions, partial conditions and rules in a way that can be reused. Using this structure, the expert system no longer requires the comparison of each object in the knowledge base against each condition of every rule. Instead, only changes in the knowledge base need to be tested.

Forward chaining is not effective in solving all problems. Some problems, such as diagnostics, are more suitable to solving by backward chaining. Backward chaining uses the same knowledge base and rule set, but operates as a depth first search working from the rules to the conditions. Backward chaining begins by examining goals. For example, a goal may be "?B." The backward chaining system looks at each rule, and finds the set of rules that have an action that produces a value for B. Using the same example rule as above, the system would see that the rule produces a value for B. The next step would be to test the conditions of the rule that provides a value for the goal. The example rule has the condition "A>10." By comparing this condition to the knowledge base, the system finds that there is a value assigned to the object A, and it is greater than 10. The inference engine would then fire the rule, solving the stated goal.

Neither forward chaining nor backward chaining is the most efficient technique in every situation. For this reason, some attempts have been made to combine forward chaining and backward chaining systems. By developing a mixed mode inferencing system that has either method at its disposal, the system can use the method best suited to a particular problem to solve a wider variety of problems in a more efficient manner. However, prior attempts to combine these methods have not been able to develop a structure that allows the expert system to operate efficiently in the backward chaining inference mode in a manner similar to the RETE network that is often employed in forward chaining.

One prior system attempts to integrate forward chaining or backward chaining in a mixed or hybrid chaining approach. The approaches for both forward chaining (FC) and backward chaining (BC) follow existing techniques, FC using Rete, BC using stack based depth-first traversal and matching. They are merged in an integrated fashion. When objects are distributed to the Rete network, rule instances may enter the conflict set. If an inference engine device detects the existence of a rule instance in the conflict set, it suspends backward chaining reasoning at that point and allows the rule to be activated. When a rule is activated, it is deleted from a goal stack.

Such an approach does not address maintaining integrity of the network. More particularly, a changed status of working memory can't be tracked which may lead to failure of the inference engine as the "backward chain" progresses across the network. In any event, it should be apparent that rule activation happens as a side effect. No selective firing of the rules is attempted.

SUMMARY

A knowledge base network is configured to solve a goal by applying a set of known facts to a set of rules until the goal is solved. An extension of the knowledge based network is created from the knowledge base network. The extended network is configured to solve the goal by testing the rules that would solve the goal against the set of known facts.

In one embodiment, the knowledge base network is extended by linking a set of conditions to a set of rules in the knowledge base network. At least one intermediate node is created such that each intermediate node corresponds to an object having a value set by one of the rules. Each intermediate node is connected to each rule that sets the intermediate node's object value. A root node is created and each intermediate node is connected to the root node.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
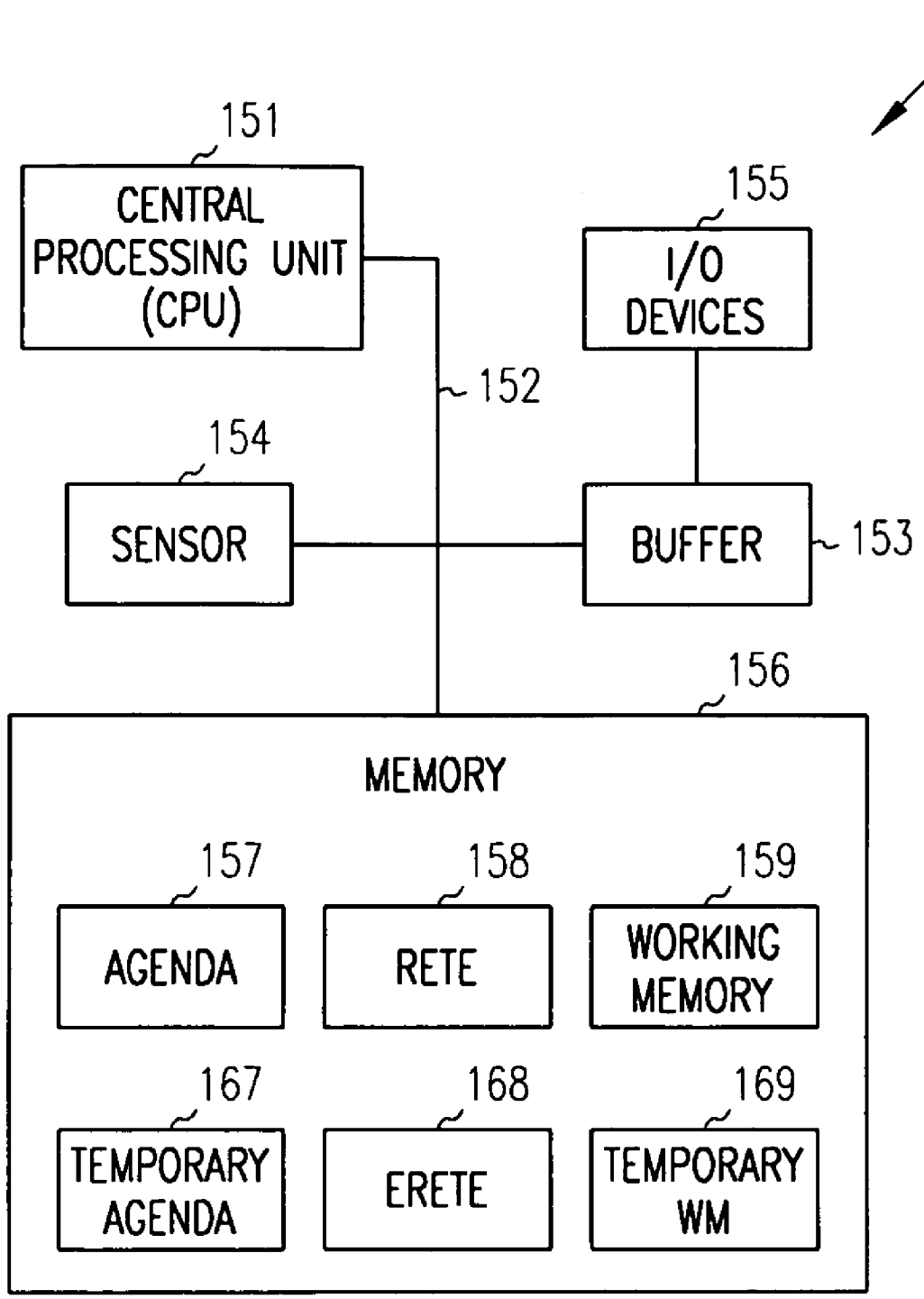
FIG. 1 is a block diagram of a simplified computer structure according to an example embodiment.

FIG. 1 shows a simplified computer system 100 for operating a knowledge base system incorporating forward and backward chaining. The system includes a central processing unit 151 connected over data bus 152 with buffer 153, sensor 154 and memory 156. In one embodiment sensor 154 provides some form of useful data to the reasoning system. In another embodiment sensor 154 is not included. In other embodiments there are multiple sensors. I/O devices 155 are coupled to the processor through buffer 153. I/O devices may include any combination of devices allowing a user to interact with the system or the system to interact with external information, including any external devices that can provide data, enter commands or display data. Memory 156 contains the information necessary for the processor to operate a reasoning system.

The reasoning system includes several components, including a forward chaining RETE network and a backward chaining ERETE network. The components are an agenda 157 containing rules that may be fired, a RETE tree 158 containing the rules and conditions connected in a tree structure as described below, and a working memory 159 containing the knowledge base of the system.

The memory 156 is extended to include further components to enable the system to handle both forward and backward chaining contexts. A temporary agenda 167 is originally a clone of agenda 157. While working in the backward chaining context however, the temporary agenda 167 may be altered.

An ERETE tree 168 is originally cloned from RETE tree 158, but is extended as explained below. ERETE tree 168 allows for the handling of backward chaining with improved efficiency. Because ERETE tree 168 is cloned from RETE tree 158, no new computations are needed to activate the appropriate alpha, beta and terminal nodes. Thus, computation time is saved because maximum use is achieved from the existing RETE tree.

A temporary working memory 169 is created as a clone of working memory 159 and contains the knowledge base. Temporary working memory 169 may be altered independently of working memory 159 when the system is operating in the backward chaining context.

Figure 2:
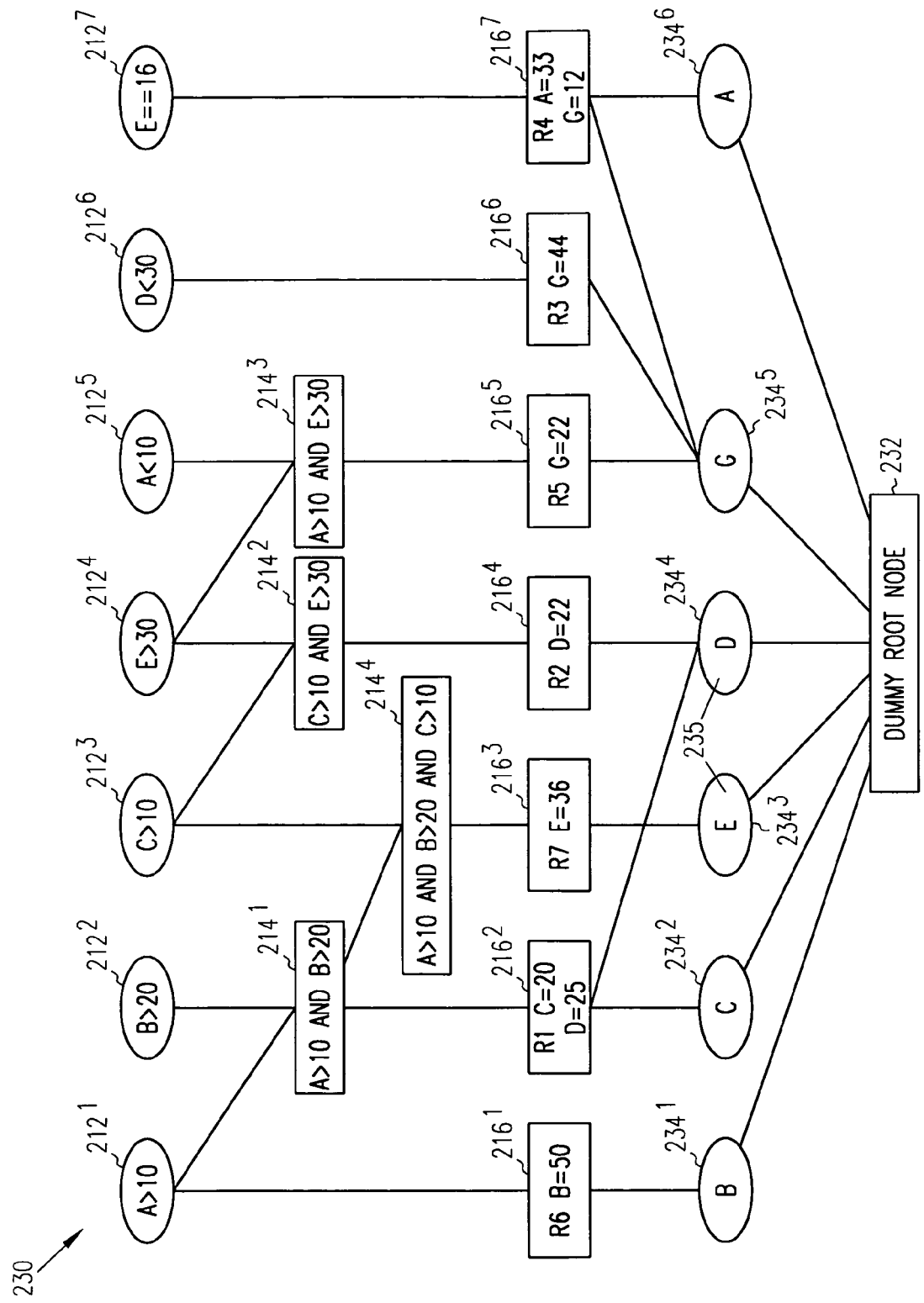
FIG. 2 is a diagram of an extended knowledge base network according to an example embodiment.

FIG. 2 shows an example of a RETE network, and its extension into an ERETE network. The RETE network 210 consists of alpha nodes $212^1$, $212^2$, $212^3$, $212^4$, $212^5$, $212^6$, through $212^7$, beta nodes $214^1$, $214^2$, $214^3$ through $214^4$ and terminal nodes $216^1$, $216^2$, $216^3$, $216^4$, $216^5$, $216^6$ through $216^7$. Each alpha node contains a condition 213. Each beta node contains a plurality of conditions 213, and is linked to the alpha nodes that contain each of the conditions. Finally, each terminal node contains a rule 217 and at least one action 219. The terminal nodes are linked to alpha nodes and beta nodes based on the conditions of their rule.

The RETE network 210 was created from a set of rules shown in Table 1. In other embodiments different RETE trees are created for alternative rule sets containing any number of rules and objects.

TABLE 1

| | Rules | |
|---|---|---|
| Name | Conditions | Actions |
| R1 | A > 10, B > 20 | C = 20, D = 25 |
| R2 | C > 10, E > 30 | D = 22 |
| R3 | D < 30 | G = 44 |
| R4 | E == 16 | A = 33, G = 12 |
| R5 | A < 10, E > 30 | G = 22 |
| R6 | A > 10 | B = 50 |
| R7 | A > 10, B > 20, C > 10 | E = 36 |

The first step in creating the RETE network 210 is to determine the alpha nodes from the conditions of the rules. Conditions that appear in multiple rules share the same alpha node, for example R1 contains the condition "A>10, " as do R6 and R7. A single alpha node $212^1$ is created containing this condition, and it is eventually linked to each of the terminal nodes containing R1, R6 and R7.

Next, beta nodes are created and linked to the appropriate alpha nodes. A beta node contains two or more conditions, and is linked to alpha nodes or beta nodes based on these conditions. For example, R1 contains both the conditions "A>10" and "B>20" contained in alpha nodes $212^1$ and $212^2$ respectively. Thus, a beta node $214^1$ is created and linked to each of these alpha nodes. R7 contains three conditions, two of them being contained in $214^1$, the other being "C>10, " which is contained in $212^3$. Beta node $214^4$ is created linked to both alpha node $212^3$ and beta node $214^1$. The remaining beta nodes $214^2$ and $214^3$ are created in a similar fashion.

Terminal nodes are created containing a rule 217 and an action 219. The action usually either adds a goal or assigns a value to an object. For example, the action 219 of terminal node $16^1$ is "B=50, " which assigns a value of 50 to the object B. An action may contain one or more such assignments or goals. The terminal nodes are linked to beta nodes and alpha nodes depending on the conditions of the rule 217 associated with each particular terminal node. For example, terminal node $216^1$ contains R6, which has a condition "A>10." This condition 213 is contained in alpha node $212^1$. Terminal node $216^1$ is therefore linked to alpha node $212^1$. Similarly, terminal node $216^2$ is linked to beta node $214^1$, and the remaining terminal nodes 163 through 167 are linked to corresponding alpha nodes $212^6$ and $212^7$, and to beta nodes $214^2$ through $214^4$.

The RETE network 210 is used for forward chaining by applying a knowledge base to the network. The knowledge base contains sets of known facts, or objects that have been assigned values. As an example, assume that the working memory contains the knowledge base consisting of "A=20, C=5." The knowledge base is compared against each alpha node. As can be seen, the only alpha node that contains a condition that is met by the knowledge base is alpha node $212^1$. This alpha node is activated, causing terminal node $216^1$ to be activated and placed in the agenda 157. In the event that multiple terminal nodes are activated simultaneously, the order of firing may be important and a priority is set beforehand. Here only R6 is activated, so it is fired. This causes the action "B=50" to be triggered. Hence, after one cycle the knowledge base consists of "A=20, C=5, B=50." The state of all the alpha nodes will be saved between cycles. However, the change in the knowledge base will activate alpha node $212^2$ because it contains the condition B>20. Alpha node $212^1$ remained active, so that beta node $214^1$ now becomes active. This causes terminal node $216^2$ to be placed in the agenda 157, and R1 is fired. The knowledge base now consists of "A=20, B=50, C=20, D=25." This process continues until no rules can be fired or a specified goal is solved.

ERETE network 230 consists of the RETE network 210 created as described above, extended with dummy root node 232 and intermediate nodes $234^1$, $234^2$, $234^3$, $234^4$, $234^5$, through $234^6$.

The network 230 is made by first creating the RETE network 210 in the same manner as discussed above. The process of extending the RETE network begins by creating the dummy root node 232. The next step is to create the intermediate nodes $234^1$ through $234^6$. Each intermediate node contains an object 235. The objects contained in each node are used in creating and linking the intermediate nodes to the terminal nodes $216^1$ through $216^7$. Each terminal node contains an action 219. Each action contains an object, and the intermediate nodes containing these objects are linked to the appropriate terminal nodes. For example, terminal nodes $216^1$ and $216^4$ contain the object D. Thus, intermediate node $234^4$, also containing the object D, is linked to terminal nodes $216^1$ and $216^4$. The remaining intermediate nodes are linked in the same way. Each of the intermediate nodes is in turn linked to dummy root node 232.

Figure 3:
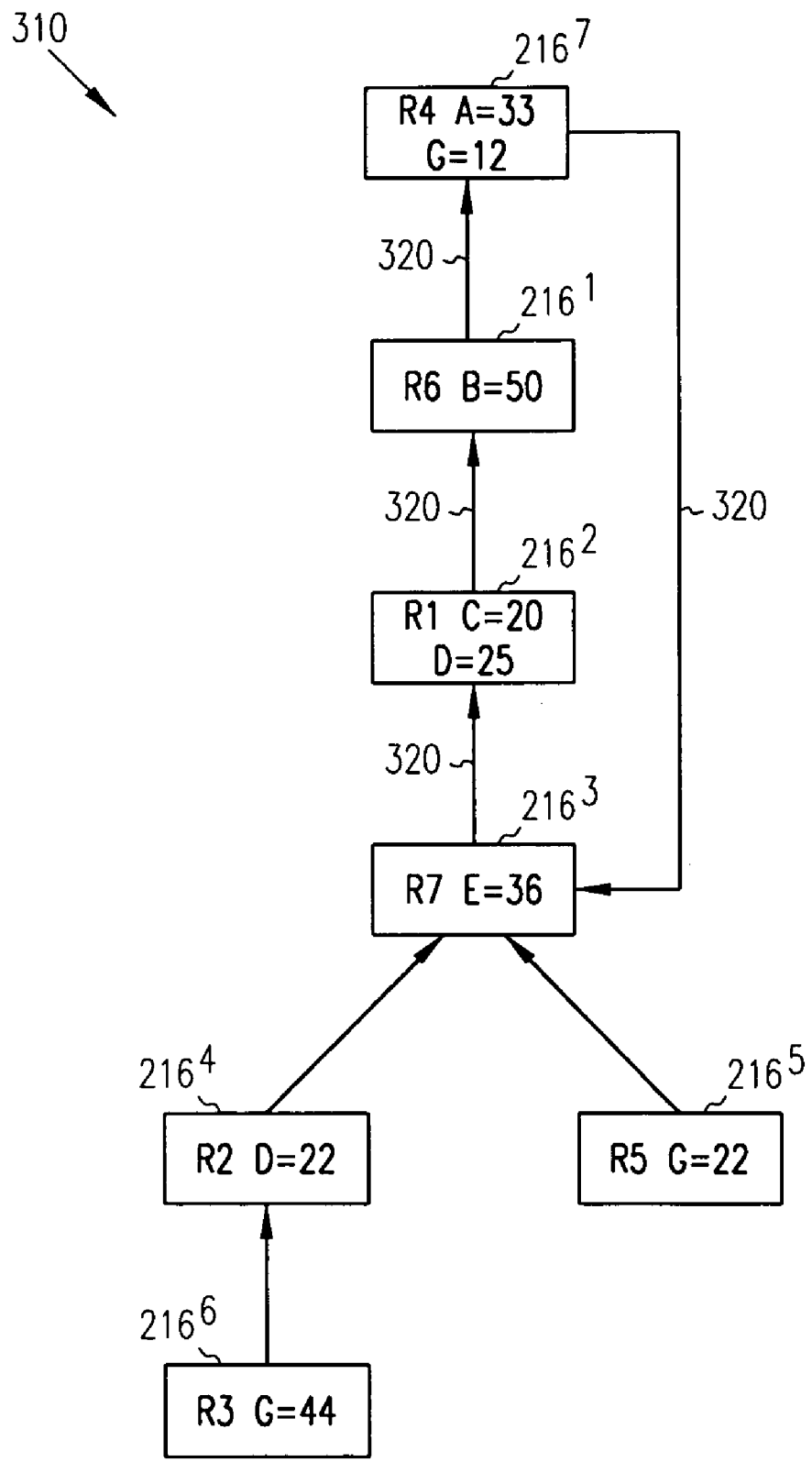
FIG. 3 is a diagram of a relationship tree for the extended knowledge base network of FIG. 2 according to an example embodiment.

FIG. 3 shows a relationship tree 310 created in relation to the ERETE network 230, utilizing nodes from FIG. 2. Relationship tree 310 shows how each terminal node affects the other terminal nodes. If a terminal node contains a rule in which the action satisfies the condition of another rule, the first rule is said to affect the second rule. For example R6 in terminal node $216^1$ contains the condition "A>10" and terminal node $216^7$ contains R4, which has an action 219 including "A=33." If R4 were fired, alpha node $212^1$ would be activated, thus terminal node $216^1$ would be affected. Therefore, it is said that R4 affects R6. Table 2 displays the complete list of relationships.

TABLE 2

| Relationships | |
|---|---|
| Rule | Affected By |
| R1 | R4, R6 |
| R2 | R1, R7 |
| R3 | R1, R2 |
| R4 | R7 |
| R5 | R4, R7 |
| R6 | R4 |
| R7 | R1, R4, R6 |

Using this information, the relationship tree 310 is formed. Terminal nodes are connected with directional connections 320. A first node that is affected by a second node is upstream of the second node. For example, R3, contained in $216^6$, is affected by R2, contained in $216^4$. Therefore $216^6$ is connected to $216^4$, with $216^6$ being upstream of $216^4$. The rest of the terminal nodes are added to the tree where appropriate. A terminal node that is affected by another does not need to be directly connected to the other terminal node. For example, R7 is affected by R6, but terminal node $216^3$ is not directly connected to terminal node $216^1$. There may also be loops. R4 is affected by R7 and R7 is affected by R4. This means that $216^7$ is connected back to $216^3$ and a loop is formed.

Figure 4:
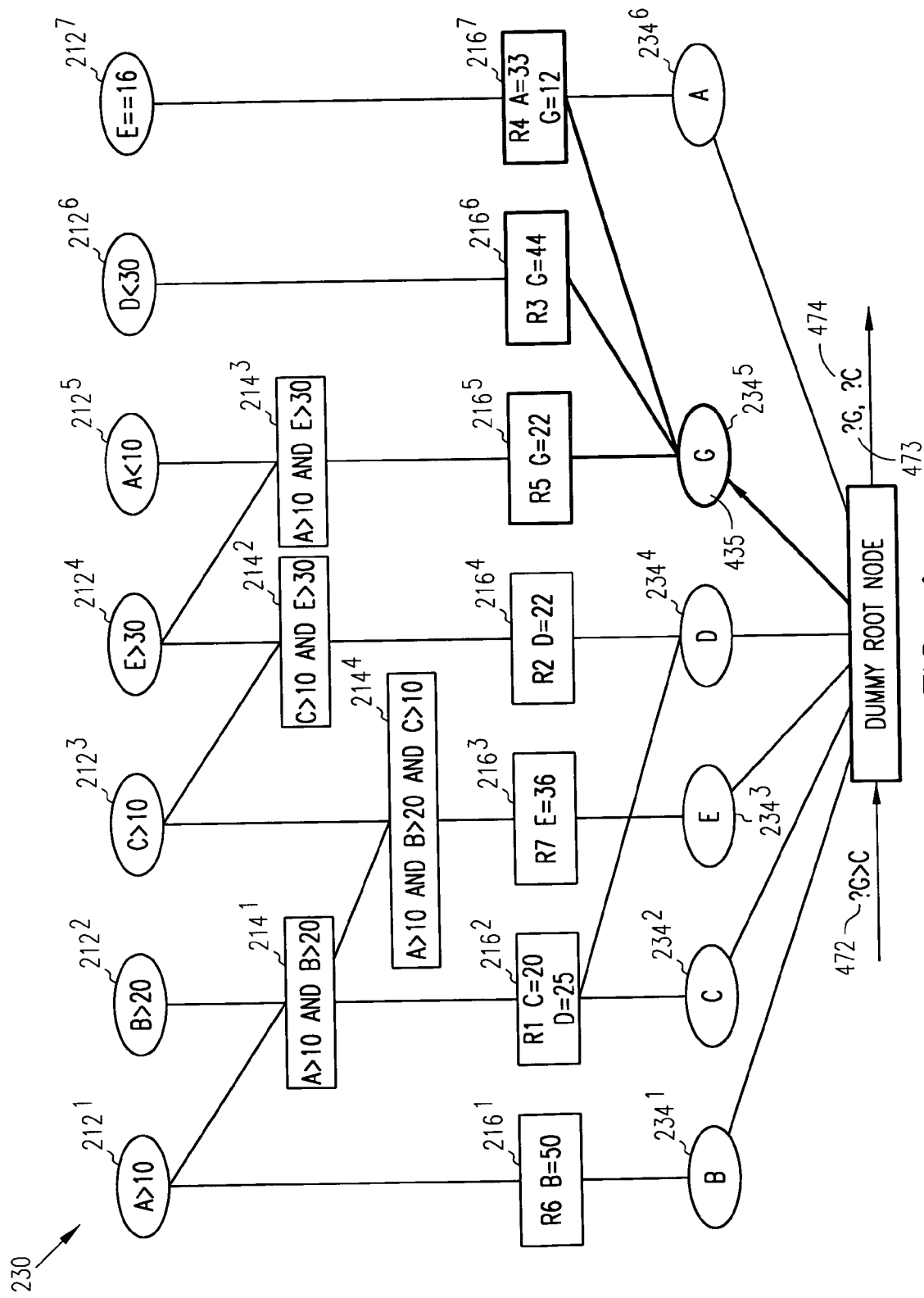
FIG. 4 is a diagram illustrating a first part of a process of backward chaining according to an example embodiment.

FIG. 4 shows the first part of the process of backward chaining according to one embodiment of the present invention. The ERETE network 230 is now receiving a goal 472. In one embodiment the goal is entered by an end user. In another embodiment the goal is created by a software program. The goal 472 is "?G>C," the network operating to determine if the statement "G>C" is true or false. To do this, the goal 472 is broken down into simple goals 473 and 474. Simple goal 473 is "?G," and simple goal 474 is "?C." These simple goals are analyzed in the ERETE network to determine each objects value. If we assume a starting knowledge base as described above, that is "A=20, C=5, " we see that "?C" is already determined. Therefore, this example will focus on finding a value for G.

The next step taken by the system after decomposing the goal 72 into simple goals is for the root node 432 to activate the appropriate intermediate node. In this case, that is intermediate node $234^5$, corresponding to the object 435, G. By activating intermediate node $234^5$, terminal nodes $216^5$, $216^6$ and $216^7$ are activated because each is linked to intermediate node $234^5$. The rules contained in these terminal nodes are referred to as the direct rules, because any of these rules would directly solve simple goal 273, "?G." The rules R5, R3 and R4 are therefore placed in a conflict set of the temporary agenda.

The set is checked to determine if any of these direct rules are active. If multiple rules are active, the rule fired is determined by a priority assigned to each rule. In one embodiment the priority is determined by the rule name, although other methods of assigning a priority are possible and well known in the art. The condition "D<30, " of R3 is contained in alpha node $212^6$ linked to terminal node $216^6$. There is no assigned value for the object D, so alpha node $212^6$ is not active. A similar check determines that R4 and R5 are also not active. This explanation is provided solely for clarity. In the current system these checks would not need to be done here, having already been done when the original RETE tree was created. The system only needs to look to see if the terminal nodes are active. Since none of the direct rules are active, the simple goal 473 could not be solved with the direct rules, and the related rules must be checked.

Related rules are found referring back to the relationship tree of FIG. 3. As discussed there, R3 is affected by R1 and R2. In one embodiment, only those rules that R3 is affected by would be examined at this stage. In another embodiment, each rule in the relationship tree downstream of R3 would be examined. In this example the system looks at each terminal node downstream. These terminal nodes $216^4$, $216^3$, $216^2$, $216^1$ and $216^7$ are placed in the conflict set of the temporary agenda. The set is checked and only terminal node $216^1$ containing R6 is active (because A>10). Thus, R6 is fired. The ERETE network is updated for the changes in the temporary working memory, causing alpha node $212^2$, beta node $214^1$ and terminal node $216^2$ to become active. At this point the direct rules still are not active, and so the system looks to the related rules again. This time terminal node $216^2$ is also active, and so the rule R1 is fired. The ERETE network is updated for this change, so that now alpha nodes $212^3$ and $212^6$ are active, along with beta node $214^4$ and terminal nodes $216^3$ and $216^6$. At this cycle, the system will find that one of the direct rules is active, and that the simple goal is therefore solvable. The direct rule R3 contained in terminal node $216^6$ is fired, augmenting the temporary working memory to include "G=44." The knowledge base now contains "A=20, B=50, C=20, D=25, G=44." Having found both simple goals of the goal 472, the system can now determine the solution. Here "?G>C" tests true, and that solution is either displayed or input back into another system.

Several advantages will be noted in the method as demonstrated by the example above. The reuse of intermediate nodes saves time in the backward chaining context. Each time a new simple goal is created, the network need only find the correct intermediate node and activate it, rather than comparing the simple goal against the actions of each rule. The example demonstrated above is a very small network with only a few rules and objects. As systems grow, this advantage becomes more obvious. Another advantage is that in checking the direct rules and related rules, the state of the network is saved between cycles. Alpha nodes that have been activated in forming the RETE network or in previous cycles will remain activated when creating and using the ERETE network, and only changes in the knowledge base will be processed. Thus, the system does not need to check the knowledge base with each condition on every cycle, instead the terminal nodes containing the rules will either be active or not. Space may also be saved. The system described uses separate spaces in the memory for the forward chaining and backward chaining contexts, but in another embodiment the forward chaining context is extended to incorporate backward chaining without cloning the parts of that system.

CONCLUSION

Mixed mode inferencing is provided by extending a RETE network to handle both forward and backward chaining efficiently. The extended RETE (ERETE) network may be created from an existing RETE network, so that unnecessary computations may be avoided.

After producing a RETE network in a system memory, a backward chaining context is created. The parts of this backward chaining context include a temporary working memory, a temporary agenda and an ERETE network. These objects are first cloned from their associated forward chaining components in the system memory: the working memory, agenda and RETE tree.

The temporary working memory includes known object values and goals. By creating this clone, the backward chaining context may operate without risk of firing rules and altering the working memory of the forward chaining context in the search process.

The temporary agenda includes active goals, simple goals, sub-goals to be tested and rules to be fired. The system includes some method for prioritizing each of these activities in the event that there are more than one, so that the temporary agenda controls what reasoning path is being pursued.

The ERETE tree is formed by extending the RETE tree. Specifically, the rules in the RETE tree are linked to intermediate nodes, and the intermediate nodes are linked to a dummy root node. The intermediate nodes represent each object that can be assigned a value, and is linked to the corresponding rules that assign that object a value.

To solve a goal, the system begins at the dummy root node and traverses the ERETE network for the given object. The rules that would give a value for that object, labeled direct rules, are tested. Because the ERETE network is an extension of the cloned RETE network, the terminal nodes will be active if the conditions are met. Thus, no additional search through the conditions is necessary when testing the rules. If this does not solve the goal, related rules are tested. Related rules are those that would satisfy the condition of one of the direct rules if fired. These rules and their sub-goals may be tested and fired to determine if the original goal is solvable.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those skilled in the art.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer system comprising:
    a central processor for performing forward chaining and backward chaining;
    a memory coupled to the central processor;
    a knowledge base forward chaining network in the memory solves a goal by applying a set of known facts to a set of rules until the goal is solved;
    an extension of the knowledge based network in the memory created from the knowledge base network; and
    the extended network solves the goal by testing the rules that would solve the goal against the set of known facts in a backward chaining manner, wherein the memory comprises an agenda containing rules to be fired for the forward chaining network, and a temporary agenda which may be altered during backward chaining without modification of the agenda.

2. The system of claim 1 wherein the knowledge base network is a RETE network including at least one alpha node and at least one terminal node.

3. The system of claim 2 wherein the extended network includes at least one intermediate node connected to the at least one terminal node of the RETE network and a root node connected to each of the at least one intermediate nodes.

4. The system of claim 3 wherein testing the rules includes checking at least one direct rule to determine if the at least one direct rule is active.

5. The system of claim 3 wherein testing the rules includes checking at least one related rule to determine if the at least one related rule is active.

6. A computer implemented method for extending a knowledge base network comprising:
    creating a forward chaining knowledge base network by linking a set of conditions to a set of rules in computer memory;
    creating at least one intermediate node such that each intermediate node corresponds to an object having a value set by one of the rules in computer memory;
    connecting each intermediate node to each rule that sets the intermediate node's object value in computer memory;
    creating a root node in computer memory; and
    connecting each intermediate node to the root node such that the root node and intermediate node function as a backward chaining network.

7. The method of claim 6 further comprising:
    receiving a goal; and
    applying forward chaining inferencing with the knowledge base network.

8. The method of claim 7 wherein the knowledge base network is a RETE network including at least one alpha node and at least one terminal node.

9. The method of claim 8 wherein the knowledge base network includes a knowledge base containing at least one fact.

10. The method of claim 9 further comprising:
    activating the at least one alpha node and the at least one terminal node based on the at least one fact before creating the at least one intermediate node.

11. The method of claim 10 further comprising:
    receiving a goal;

breaking the goal into at least one simple goals;
traversing the extended network from the root node to one of the at least one intermediate nodes based on the at least one simple goals;
determining if the rules connected to the at least one intermediate nodes are active; and
firing the active rules.

12. The method of claim 11 further comprising:
determining if any rule is active that affects the rules connected to the at least one intermediate nodes;
firing the active rules.

13. A computer implemented method comprising:
creating an extension of a forward chaining knowledge base network in computer memory solves a goal in a backward chaining manner by applying a set of known facts to a set of rules until the goal is solved, such that the extended network is solves the goal by testing the rules that would solve the goal against the set of known facts such that a working memory for the forward chaining knowledge base network is not disturbed during backward chaining.

14. The method of claim 13 wherein the knowledge base network is a RETE network.

15. A computer readable medium having a data structure stored thereon for use by a computer for implementing a knowledge base network, the data structure comprising:
a forward chaining RETE knowledge base network having multiple nodes, terminal nodes; and
an extension of the knowledge base network having multiple intermediate nodes coupled to terminal nodes of the knowledge base network, and having a dummy root node connected to each of the intermediate nodes, wherein the intermediate nodes have object values defined by rules in corresponding terminal nodes, and wherein the dummy root node accepts a goal, and initiates backward chaining utilizing the intermediate nodes.

16. A system comprising:
processing unit;
I/O devices coupled to the processing unit; and
a memory comprising:
a first knowledge base network for forward chaining inferencing; and
an extension of the first knowledge base network for backward chaining inferencing.

17. The system of claim 16 wherein the extended knowledge base network is a clone of the knowledge base network, and further comprising intermediate nodes containing values defined by rules in terminal nodes of the knowledge base network and a root node.

18. The system of claim 16 wherein the memory further comprises a working memory for the knowledge base network, and a temporary working memory for the knowledge base network.

19. The system of claim 16 wherein the memory further comprises an agenda for the knowledge base network and a temporary agenda for the extended knowledge base network.

20. The system of claim 16 wherein the first and second knowledge base network comprises a RETE network.

21. The system of claim 20 wherein the RETE network is stored in a tree.

22. The system of claim 21 wherein the tree comprises alpha nodes, each storing a condition, beta nodes, each storing multiple conditions, and terminal nodes specifying rules and actions.

23. The system of claim 22 wherein the extended RETE network tree further comprises a dummy root node, and intermediate nodes coupled to the terminal nodes and to the dummy root node.

24. The system of claim 16 wherein the first and second knowledge bases share memory.

25. A computer-controlled system for reasoning a discrimination-oriented knowledge base having objects and rules, the system comprising:
means for extending the knowledge base network to provide an augmented knowledge base network;
means for storing at least one fact to a working memory (WM) to indicate a current status of the fact in the working memory (WM);
means for distributing the current status of the WM across plurality of intermediate nodes of the extended knowledge base network; and
means for querying the extended knowledge base network wherein said querying is adapted for backward inferencing about the object with respect to a predetermined goal.

26. The system of claim 25, wherein said querying is further adapted for forward inferencing based on working memory changes consequent to predetermined priorities of rule firing.

27. The system of claim 25, wherein extending the knowledge base network further comprises providing at least one root memory node of the knowledge base network wherein each of the root memory node comprises the rule having an original condition and an action being executed on satisfaction of the condition isolating the action from the original condition in each of the root node to provide a plurality of simple condition corresponding to each rule storing each of the simple condition in a plurality of intermediate memory nodes to establish hierarchy of the extended knowledge base network.

28. The system of claim 25 wherein a fact comprises a true statement.

29. The system of claim 25 wherein a status of the fact comprises an object value.

30. The system of claim 25 wherein working memory is protected during backward inferencing.

* * * * *